(12) United States Patent
Robinson et al.

(10) Patent No.: US 8,334,005 B2
(45) Date of Patent: Dec. 18, 2012

(54) RIBBON CUTTER APPARATUS AND METHOD FOR MAKING SANDWICH BAKED GOODS

(75) Inventors: Chris E. Robinson, Sparta, NJ (US);
Theodore N. Janulis, Randolph, NJ (US); Mihaelos Nicholas Mihalos, Palisades Park, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 891 days.

(21) Appl. No.: 12/271,563

(22) Filed: Nov. 14, 2008

(65) Prior Publication Data
US 2010/0124593 A1 May 20, 2010

(51) Int. Cl.
*A21D 13/00* (2006.01)
(52) U.S. Cl. ......... 426/275; 426/516; 426/517; 426/518
(58) Field of Classification Search .................. None
See application file for complete search history.

(56) References Cited

U.S. PATENT DOCUMENTS

| | | | |
|---|---|---|---|
| 2,868,141 A | 1/1959 | Griner |
| 2,993,453 A | 7/1961 | Fay |
| RE25,072 E | 10/1961 | Monaco |
| 3,119,352 A | 1/1964 | Fay |
| 3,249,133 A | 5/1966 | Goodman et al. |
| 3,276,397 A | 10/1966 | Poppe et al. |
| 3,340,824 A | 9/1967 | Talbot |
| 3,343,504 A | 9/1967 | Beik |
| 3,348,503 A | 10/1967 | Beik et al. |
| 3,762,305 A | 10/1973 | Glackin |
| 3,828,660 A | 8/1974 | Mueller et al. |
| 3,850,088 A | 11/1974 | Tobey et al. |
| 3,871,274 A | 3/1975 | Hornby |
| 3,945,785 A | 3/1976 | Belshaw et al. |
| 4,004,035 A | 1/1977 | Hirzel et al. |
| 4,098,909 A | 7/1978 | Mims |
| 4,114,524 A | 9/1978 | Welch |
| 4,162,882 A | 7/1979 | Rose |
| 4,194,443 A | 3/1980 | Mims |
| 4,329,920 A | 5/1982 | Rose et al. |
| 4,397,628 A | 8/1983 | Pinto et al. |
| 4,469,021 A | 9/1984 | Rose et al. |
| 4,502,376 A | 3/1985 | Cosse |
| 4,612,852 A | 9/1986 | Price et al. |
| 4,618,499 A | 10/1986 | Wainwright |
| 4,622,891 A | 11/1986 | Cramer et al. |
| 4,661,366 A | 4/1987 | Pinto et al. |
| 4,708,054 A | 11/1987 | Newbery et al. |

(Continued)

FOREIGN PATENT DOCUMENTS

CA 2 378 264 1/2001

(Continued)

*Primary Examiner* — Lien Tran
(74) *Attorney, Agent, or Firm* — Greenblum & Bernstein, P.L.C.

(57) ABSTRACT

A method for the continuous production of sandwich baked goods having a high volume of filler includes conveying a bottom base cake, detecting the position of the base cake, and extruding a filler through a die aperture to form a ribbon in response to the detection of the position of the bottom base cake. In response to detection of the base cake, a signal or timing mechanism may activate a guillotine knife or blade to open the die aperture to allow filler to be deposited on the bottom base cake and to close the die aperture to sever or cut the ribbon to a predetermined dimension. The severing prevents further flow of the filler through the die aperture until the next bottom base cake is detected and the die aperture is again opened to allow filler to be deposited on the next bottom base cake.

17 Claims, 5 Drawing Sheets

U.S. PATENT DOCUMENTS

| | | |
|---|---|---|
| 4,796,522 A | 1/1989 | Lynch |
| 4,850,833 A | 7/1989 | Pinto et al. |
| 4,958,556 A | 9/1990 | Aquino et al. |
| 5,435,714 A | 7/1995 | Van Lengerich et al. |
| 5,498,286 A | 3/1996 | Milohanic |
| RE36,147 E | 3/1999 | Backus et al. |
| 5,974,958 A | 11/1999 | Lilley et al. |
| 6,874,409 B2 | 4/2005 | Valenzky, Jr. et al. |
| 6,955,722 B2 | 10/2005 | Ackerman |
| 2006/0045939 A1 | 3/2006 | Mihalos et al. |

FOREIGN PATENT DOCUMENTS

| | | |
|---|---|---|
| CN | 2539400 | 3/2003 |
| EP | 0 617 895 | 1/1996 |
| WO | 94/28727 | 12/1994 |

RIBBON CUTTER APPARATUS AND METHOD FOR MAKING SANDWICH BAKED GOODS

FIELD OF THE INVENTION

The present invention generally relates to the continuous production of sandwich baked goods having a filler or filler creme, and more particularly, to methods and apparatus for mass producing sandwich baked goods using a ribbon cutter apparatus to achieve a high content of filler or filler creme.

BACKGROUND OF THE INVENTION

Sandwich cookies are made from two equally-sized cookie halves and a cream filler. A filler or crème depositor applies the filler to the lower base cake, and top base cake is applied to the resulting filler and bottom base cake laminate. To handle deposits for fillers or crèmes of large volumes and maintain production speeds, multiple rotating stencil drums depositors would have to be considered. A crème depositor generally includes a tubular shaft having one or more stencil ports around which a depositor drum rotates. As the depositor drum rotates, a fixed cutoff wire cuts off the filler crème for each stencil, thereby leaving a defined deposit of filler crème on a lower base cake. This approach works well when trying to deposit small quantities of filler like Oreo® Crème. However, when the volume of material gets large as when attempting to produce a large sandwiched product, then the depositor drum cannot provide enough crème for the volume required and the system is therefore inadequate. Using multiple depositor drums to separately deposit filler in several stages to meet the larger filler volume requirements requires precise timing to make sure that the fillers are deposited evenly and back to back to ensure proper depositing of the filler or crèmes onto the base cake. The system is complex in terms of piping and pumping and complicated synchronization is required.

U.S. Pat. No. 4,114,524 to Welch discloses a machine for automatically making sandwiches having filler material located between two cookie halves. The machine comprises a dividing mechanism for receiving rows of cookie halves and for directing alternate rows of cookie halves to a top conveyor and a bottom conveyor. A filler applicator is located above the bottom conveyor for applying filling to the rows of cookie halves on the bottom conveyor. The top conveyor transports rows of cookie halves and deposits them at a sandwich location downstream from the filler applicator.

U.S. Pat. Nos. 4,098,909 and 4,194,443, both to Mims, disclose a method and apparatus for depositing filling on cookie halves having a flat side up. A vacuum pick-up device raises rows of cookie halves having a flat side down and deposits them on the filled cookie halves.

U.S. Pat. No. 2,993,453 to Fay discloses a sandwiching machine for assembling sandwiches that comprise two cookies with a cream filler between them. A conveyor feeds cookies to a cream depositor which deposits a layer of cream on the cookies. Then, another cookie is deposited on the layer of cream and the assembled sandwiches are delivered to a stacker. The cookies are supported by a taut wire arrangement. Pin-like fingers of a conveyor chain slide the cookies along the supporting wires. The cream depositor comprises a tubular shaft having a pair of stencil ports around which a depositor drum rotates. The disclosure of U.S. Pat. No. 2,993,453 to Fay is incorporated herein by reference in its entirety.

U.S. Pat. No. 4,329,920 to Rose et al. discloses an automatic sandwiching machine for cookies. A cookie is deposited from a magazine onto taut parallel wires and conveyed along the wires by pins extending upwardly carried by links of endless chains of a conveyor. A turn-over wheel transfers the cookie from the magazine design-side down onto the parallel wires and then a cream valve or stencil applies cream to the plain side of the cookie. Another cookie is then applied to the cream with the design-side up. The disclosure of U.S. Pat. No. 4,329,920 to Rose et al. is incorporated herein by reference in its entirety.

U.S. Pat. No. 4,469,021 to Rose et al. discloses a sandwiching machine for applying cream, for example, a chocolate or vanilla flavored filling, jelly, peanut butter or the like, to at least two laterally spaced rows of cookies traveling along the sandwiching machine. The sandwiching machine includes a stencil means for applying cream to the cookies in a uniform manner. The stencil assembly comprises a stencil sleeve and a stencil rotatable thereon. The stencil has spaced apart discharge orifices. The stencil sleeve has inlets at each side of the discharge orifices and valve means for controlling the flow of cream through the discharge orifices. A cream hopper communicates with the stencil sleeve inlets. The disclosure of U.S. Pat. No. 4,469,021 to Rose et al. is incorporated herein by reference in its entirety.

The present invention provides for the continuous, mass production of sandwich baked goods such as sandwich cookies and sandwich crackers having a high volume of filler crème covering large base cakes, at high production rates using a single depositor rather than multiple depositors. Products containing a large surface area of filler crème, such as large rectangular or elongated products, rather than round products may be produced rapidly with accurate placement of the filler on the bottom base cake using the method and apparatus of the present invention.

SUMMARY OF THE INVENTION

In a first aspect of the invention, sandwich baked goods, such as sandwich cookies or sandwich crackers having a high volume of filler or filler crème are continuously produced by accurately laminating individual base cakes with a ribbon of filler. In embodiments of the invention, the volume of filler deposited on each bottom base cake may be at least about 1.5 cubic inches, for example at least about 1.75 cubic inches, and the deposited filler may have a length to width ratio of at least about 2:1, preferably at least about 2.5:1. The base cakes and the ribbon of filler may be elongated in the direction of conveyance during deposition of the ribbon of filler. In embodiments of the invention the filler may be deposited with an uneven surface pattern using a die having a saw tooth pattern aperture, or the filler may be deposited with a substantially even surface pattern using a die aperture in the form or shape of a slit. In other embodiments, the filler may contain particulates, such as chocolate chips.

The sandwich baked goods may be produced continuously and at high mass production rates by conveying a bottom base cake having a leading edge and a trailing edge, detecting the position of the base cake, extruding a filler through a die aperture to form a ribbon having a leading edge in response to the detection of the position of the bottom base cake, depositing the ribbon onto the bottom base cake so that the leading edge of the ribbon is at or near the leading edge of the bottom base cake, severing the ribbon to form a laminate of the filler on the bottom base cake, and depositing a top base cake on the laminate to form a sandwich baked good. In other aspects of the invention, non-sandwich baked goods, such as cookie bars may be produced without the need for a top base cake.

In accordance with the present invention, when the ribbon is severed, further flow of the filler through the die aperture is prevented until the next bottom base cake is detected, and the die aperture is opened to allow filler to be deposited on the next bottom base cake. The ribbon may be severed and the flow of filler may be prevented by a guillotine knife or blade. The filler may be pumped into and through a tubular shaft equipped with the die aperture, and as the filler emerges from the die aperture the filler may be deposited upon the lower base cakes while the lower base cakes are conveyed past the die aperture.

In embodiments of the invention, an edge of the bottom base cake may be detected and in response to the detection a signal or timing mechanism may activate the guillotine knife or blade to open the die aperture to allow filler to be deposited on the bottom base cake, and may activate the guillotine knife or blade to close the die aperture to sever or cut the ribbon to a predetermined dimension. For example, the leading edge or trailing edge of the bottom base cake may be detected and in response to the detection a signal or timing mechanism may activate a guillotine knife or blade to open the die aperture to allow filler to be deposited on a bottom base cake. Also, a leading or a trailing edge of the bottom base cake may be detected, and in response to the detection a signal or timing mechanism may activate a guillotine knife or blade to sever or cut the ribbon to a predetermined dimension, and block further extrusion of the filler until the next deposition cycle for the next base cake.

A timing mechanism may activate the guillotine knife or blade after a predetermined amount of time which is calculated so that the leading edge of the ribbon is deposited near the leading edge of the bottom base cake. Also, in response to the detection, a signal or a timing mechanism may activate the guillotine knife or blade after a predetermined amount of time which is calculated so that the ribbon is severed to obtain a ribbon trailing edge, and the ribbon trailing edge is permitted to fall onto the bottom base cake so the ribbon trailing edge is at or near the trailing edge of the bottom base cake.

In embodiments of the invention, the lower base cakes may be conveyed by a plurality of pins which push the lower base cakes past the die aperture, an edge of the bottom base cake may be detected by detecting the presence of at least one pin conveying the bottom base cake, and in response to the detection a signal or timing mechanism may activate a guillotine knife or blade to open the die aperture to allow filler to be deposited on a bottom base cake and may activate the guillotine knife or blade to close the die aperture to sever or cut the ribbon to a predetermined dimension.

In another aspect of the present invention, apparatus for the continuous production of sandwich baked goods may include a conveyor system for conveying a bottom base cake having a leading edge and a trailing edge, a detector device for detecting the position of the bottom base cake, a filler depositor for applying a layer of filler onto the bottom base cake as the bottom base cake is being conveyed to obtain a laminate of the filler on the bottom base cake, and a top base cake depositing device for depositing or applying a top base cake to the laminate to obtain a sandwich baked good. In the production of un-sandwiched or non-sandwich baked goods such as cookie bars having a layer of filler laminated only to a bottom base cake, a top base cake depositing device is not needed. The conveyer system may include a plurality of wires upon which the lower base cakes are transported, and a plurality of pins which push the lower base cakes to convey the base cakes along the wires.

The filler depositor may comprise a tubular shaft with an inner cavity, at least one inlet for supplying filler to the inner cavity of the tubular shaft, an outlet opening in a side of the shaft, a die having a die aperture in fluid communication through the outlet opening with the inner cavity for receiving filler from the inner cavity and for extruding filler through the die aperture, and a guillotine knife or blade for opening and closing the die aperture and for severing or cutting a ribbon of filler extruded from the die aperture in response to the detection of the position of the bottom base cake by the detector device.

The die may include a guide for the guillotine knife or blade which protrudes into an open portion of the guillotine knife or blade, and a guillotine retainer which is secured to the guide. The guillotine knife or blade may be mounted on a bracket for sliding engagement with the die and the retainer. A pneumatic device may be connected to the guillotine knife or blade for moving the knife or blade or cutter over the die aperture to close and open the die aperture.

The detector device may include a signal or timing mechanism which activates the guillotine knife or blade to open the die aperture to allow filler to be deposited on the bottom base cake. The signal or timing mechanism may also activate the guillotine knife or blade to close the die aperture. Closing of the die aperture severs or cuts the ribbon to a predetermined dimension. The closing of the die aperture also prevents further flow of the filler through the die aperture until the next bottom base cake is detected and the die aperture is opened to allow filler to be deposited on the next bottom base cake.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Sandwich baked goods, such as sandwich cookies or sandwich crackers may be continuously produced by laminating individual base cakes with a ribbon of filler to achieve a high volume of filler or filler crème. The filler may be deposited on elongated pieces to achieve a high surface area with accurate deposition at high production rates. The flow of filler crème onto moving bottom base cakes and severing or cutting of the ribbon of filler is performed using a guillotine knife, blade, or cutter.

Figure 1:
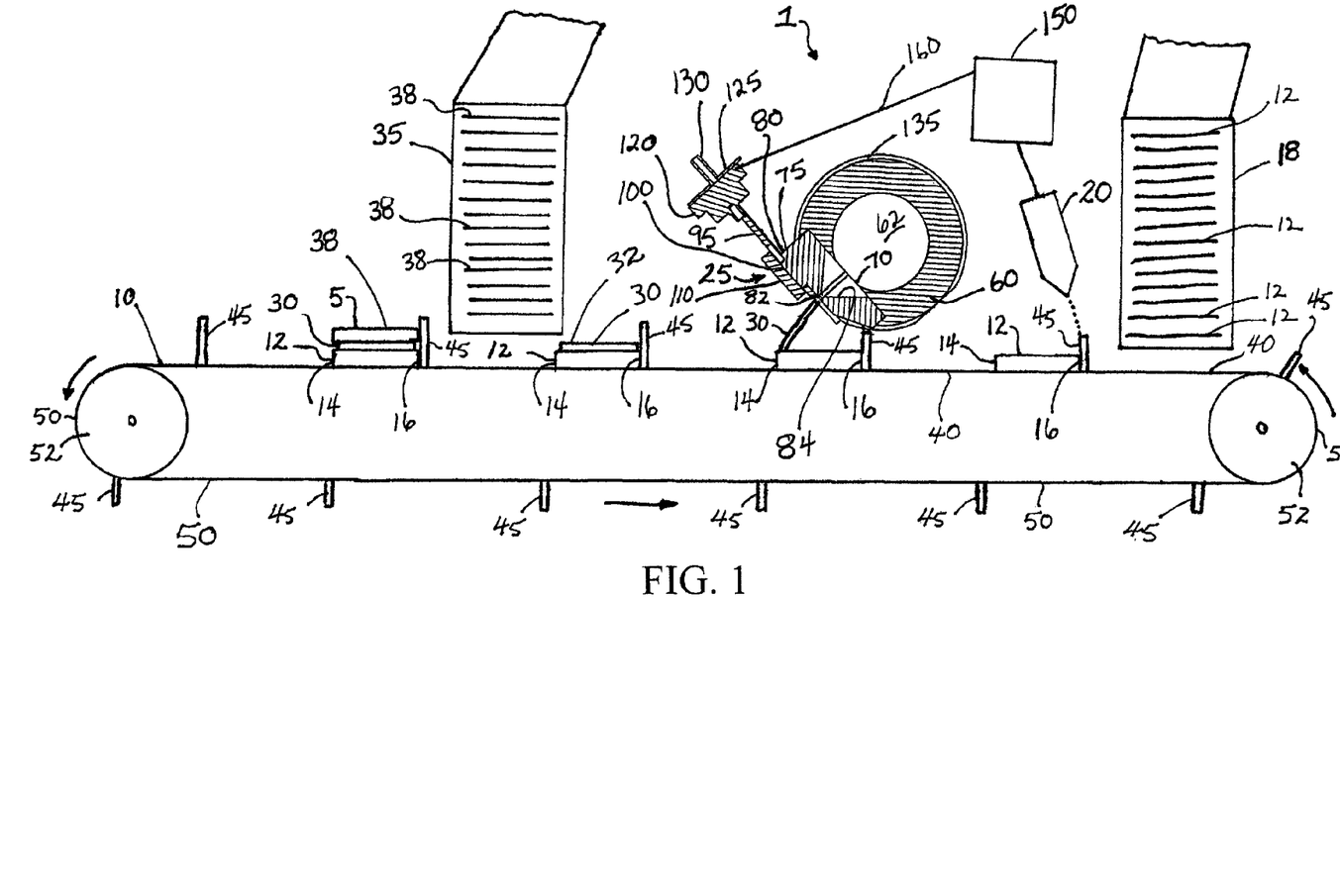
FIG. 1 schematically shows an apparatus for the continuous production of sandwich baked goods which may be employed for the continuous production of sandwich products having a high volume of filler or filler crème in accordance with the present invention.

As shown in FIG. 1, in accordance with the present invention, apparatus 1 for the continuous production of sandwich baked goods 5 may include a conveyor system 10 for conveying a bottom base cake 12 having a leading edge 14 and a trailing edge 16. The bottom base cake 12 may be supplied from a bottom base cake supply device 18. The apparatus 1 may also include a detector device 20 for detecting the position of the bottom base cake 12. A filler depositor or mandrel assembly 25 (shown in cross-section along line 4-4 of FIG. 4) may be located downstream of the detector device 20 for applying a layer of filler or filler crème 30 onto the bottom base cake 12 as the bottom base cake 12 is being conveyed to obtain a laminate 32 of the filler 30 on the bottom base cake 12. A top base cake depositing device 35 may be located downstream of the filler depositor 25 for depositing or applying a top base cake 38 to the laminate to obtain a sandwich baked good 5. The conveyer system 10 may include a plurality of wires 40 upon which the lower base cakes 12 are transported, and a plurality of chain-driven pins 45 which push the lower base cakes 12 to convey the base cakes 12 along the wires, as well as the laminate 32 and sandwich baked good 5. The pins 45 may be driven by a continuous loop chain 50 and a chain drive mechanism 52.

As shown in FIGS. 1-5, the filler depositor or mandrel assembly 25 may comprise a tubular shaft, cylinder, or stencil mandrel 60. As shown in FIGS. 1-5 and 7, the tubular shaft or mandrel 60 has an inner cavity 62, at least one inlet 65 for supplying filler 30 to the inner cavity 62 of the tubular shaft 60, and an outlet opening 70 in a side of the shaft 60. The tubular shaft preferably has two inlets 65, each of which are located at opposing ends 72, 74 of the tubular shaft 60 with the outlet opening 70 being about centrally located between the two opposing ends 72, 74 as shown in FIGS. 2, 3, 5, and 7. Filler may be supplied to the inlets 65 by a pump (not shown).

As shown in FIGS. 1-6, a guillotine assembly 75 may include a die 80 having a die aperture 82 in fluid communication through the outlet opening 70 with the inner cavity 62 for receiving filler 30 from the inner cavity 62. The die may have an inner passageway or chamber 84 for receiving filler 30 from the inner cavity 62 and which tapers inwardly toward the die aperture 82 for extruding filler 30 through the die aperture 82. The die 80 may sealingly fit into the outlet opening 70. The die may be secured or attached to the tubular shaft, or cylinder, or stencil mandrel 60 using conventional fasteners such as bolts or screws 86 which pass through holes 88 in the die 80 into threaded holes 90 in the tubular sleeve or mandrel 60 shown in FIG. 7. The die may be made from moldable plastic material such as polyethylene, polypropylene, polyvinylchloride, nylon, and the like.

Figures 2, 3, 4:
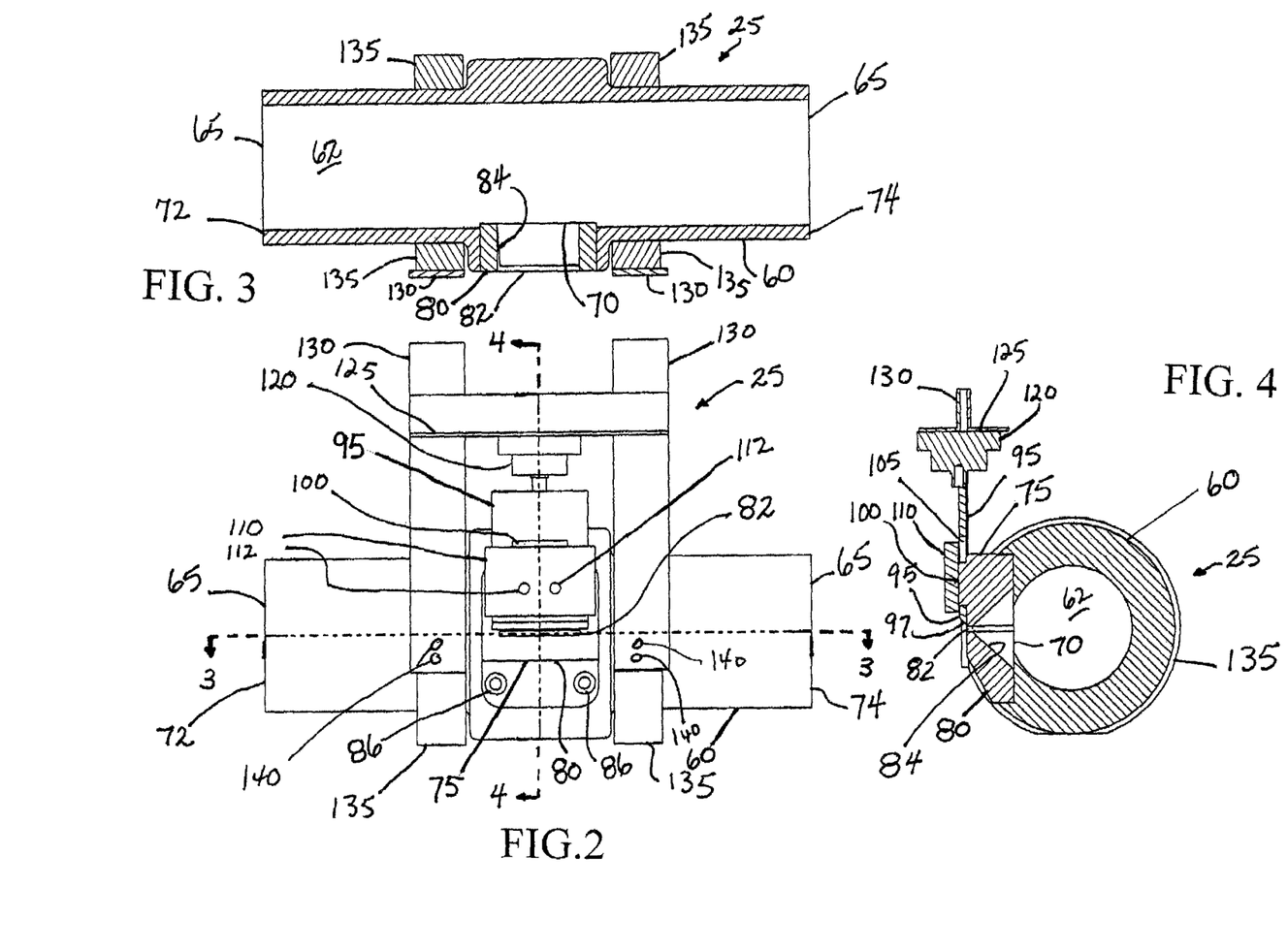
FIG. 2 is a front elevational view of a filler depositor or mandrel assembly for applying a layer of filler onto a bottom base cake as the bottom base cake is being conveyed to obtain a laminate of the filler on the bottom base cake as shown in FIG. 1.
FIG. 3 schematically shows a top cross sectional view of the filler depositor or mandrel assembly of FIG. 2 along line 3-3.
FIG. 4 schematically shows a side view of the filler depositor or mandrel assembly of FIG. 2 along line 4-4.
Figure 5:
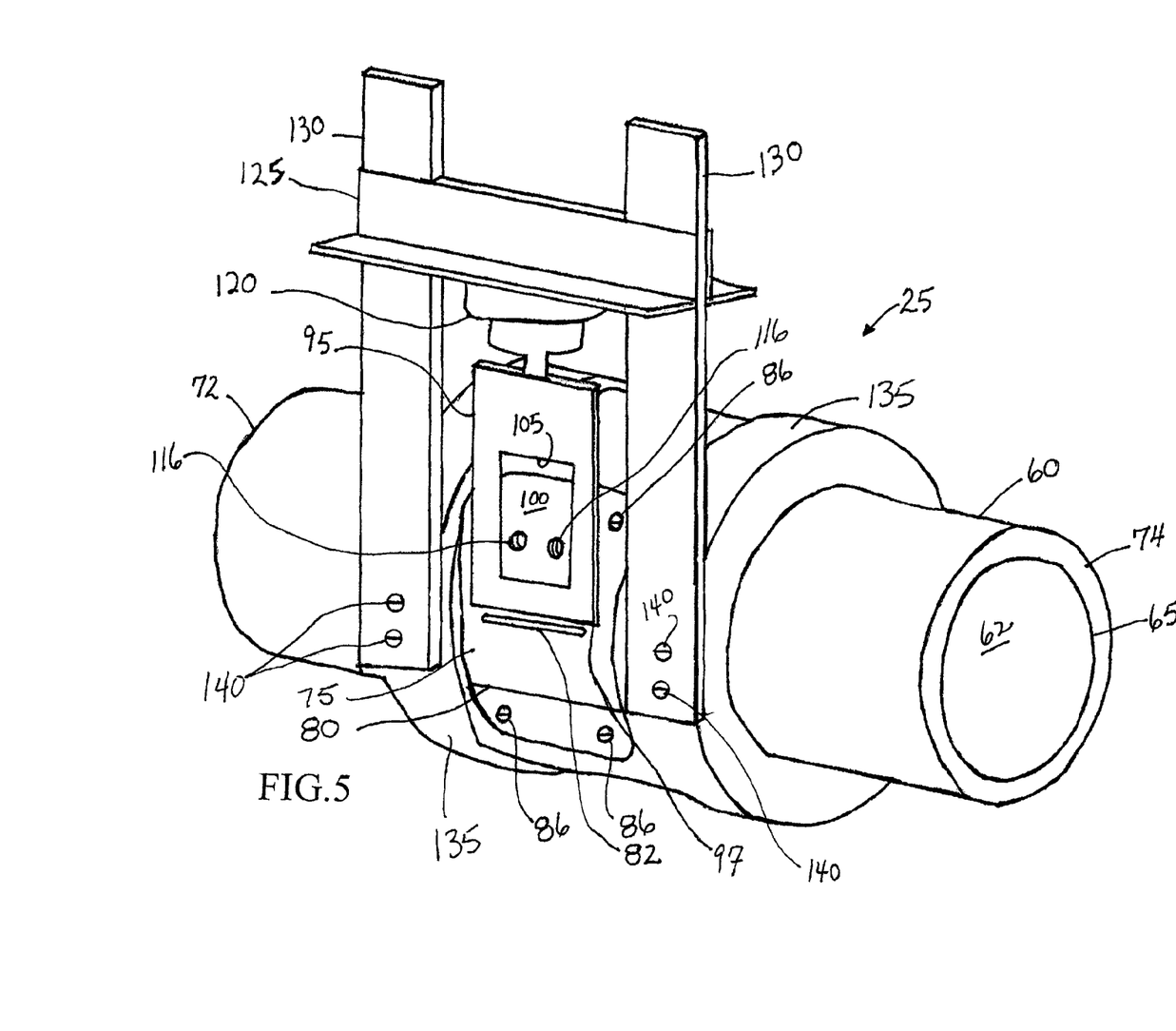
FIG. 5 schematically shows a perspective view of a filler depositor or mandrel assembly of FIG. 2 with the guillotine retainer removed.
Figure 6:
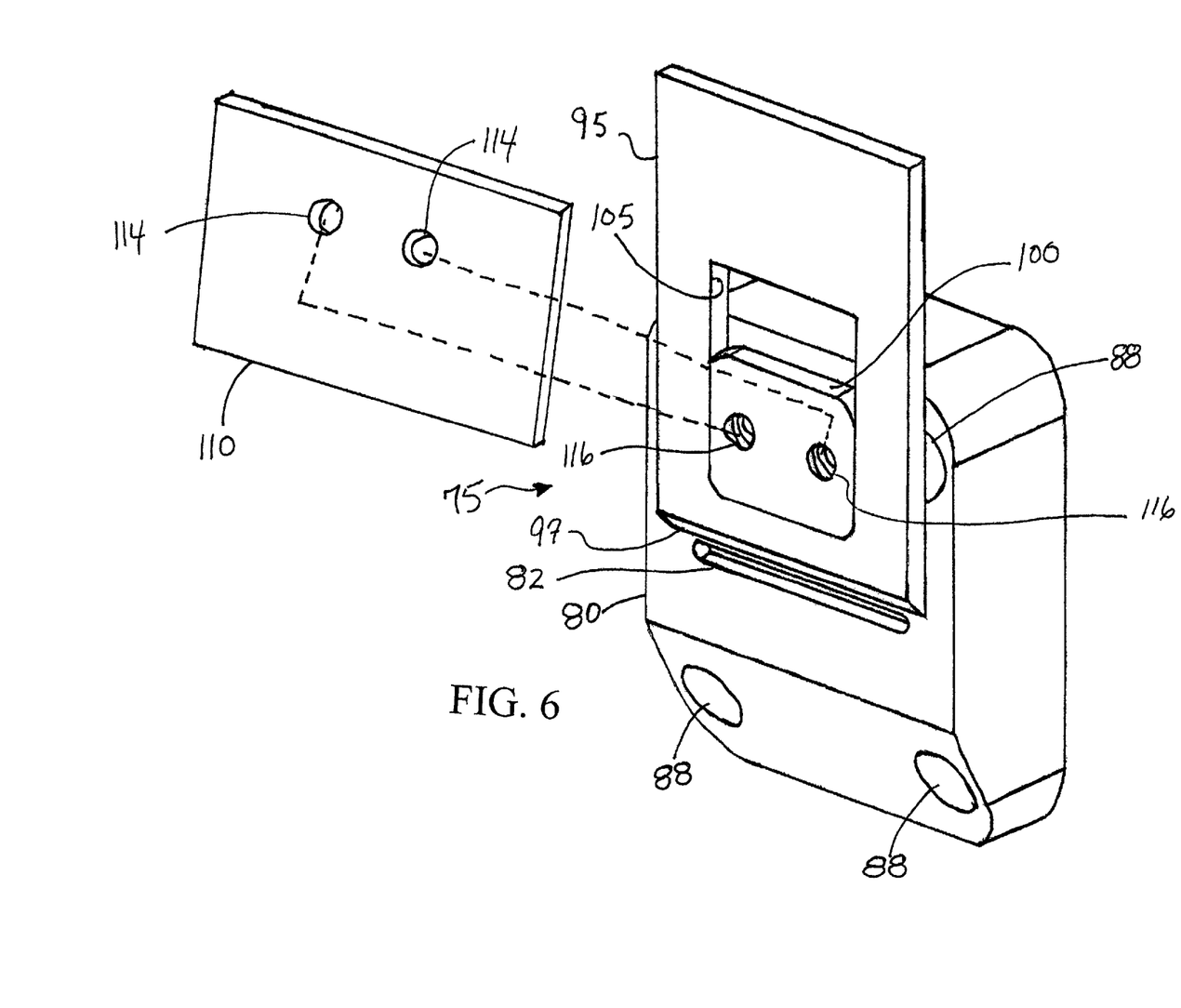
FIG. 6 schematically shows an exploded perspective view of a die and a guillotine assembly with a guillotine retainer of the filler depositor or mandrel assembly of FIG. 2.
Figure 7:
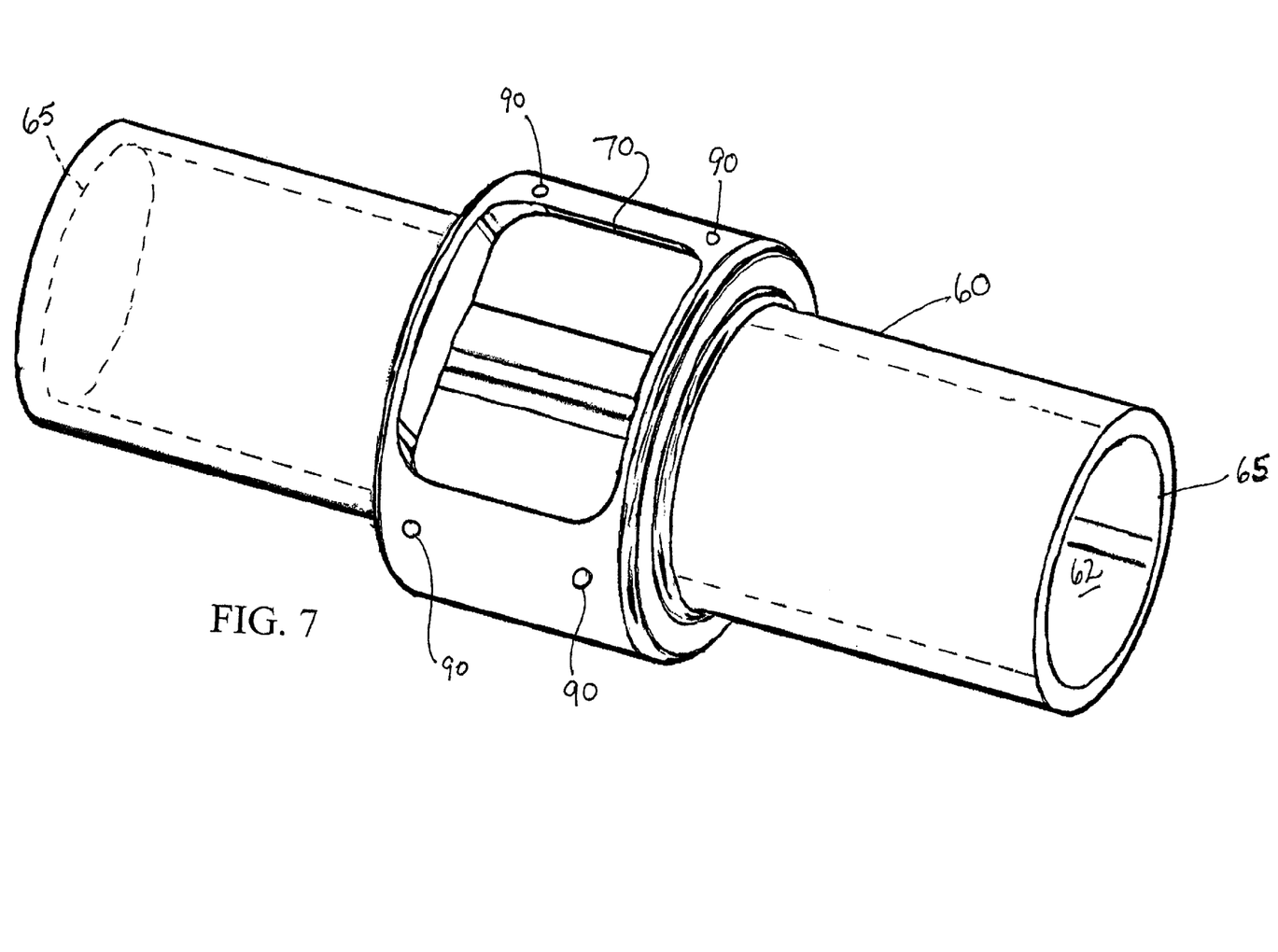
FIG. 7 schematically shows a perspective view of a stencil mandrel of the filler depositor or mandrel assembly of FIG. 2

As shown in FIG. 1 the filler depositor 25, and the guillotine assembly 75 and die 80 may be arranged so that the longitudinal axis through the die aperture 82 in the direction of flow of filler 30 is at an angle to the plane of the top surface of the bottom base cake and conveyer, or the vertical, so that the filler ribbon does not flow straight down (angle of 0° to the vertical) as in a conventional stencil mandrel. The angle of orientation to the vertical employed in the present invention may generally be from about 10° to about 90°, preferably from about 15° to about 45°, most preferably from about 25° to about 35°, for example about 30° or about "7 O'clock." The aperture 82 may have an elongated, rectangular or slit shape as shown in FIGS. 2, 5, and 6 to obtain a substantially even filler surface. In other embodiments, the aperture may have an irregular shape, such as a saw tooth pattern to deposit a ribbon of filler with an uneven shape.

The guillotine assembly 75, as shown in FIGS. 1, 2, 4, 5, and 6 may include a guillotine knife or blade or cutter 95 for opening and closing the die aperture 82. The guillotine knife or blade includes a cutting edge 97 for severing or cutting a ribbon of filler 30 extruded from the die aperture 82 in response to the detection of the position of the bottom base cake 12 by the detector device 20. Extension or downward movement of the guillotine knife 95 severs the filler ribbon at the die aperture 82. The guillotine knife 95 blocks the aperture 82 and retention of the guillotine in its downward-most severing position prevents further flow of filler and ribbon creation until the guillotine knife is retracted for deposition of the filler onto the next base cake 12

The guillotine assembly 75 or die 80 may include a guide 100 for the guillotine knife or blade 95 which protrudes into an open portion 105 of the guillotine knife or blade 95 which has approximately the same width as the width of the guide 100, but a longer length than the length of the guide 100. The guide 100 prevents lateral movement and also provides a limit or stop point for the retraction and extension movement of the guillotine knife or blade 95. The guillotine assembly 75 may also include a guillotine retainer 110, which may be a flat plate, which helps to prevent movement of the guillotine knife or blade 95 in a direction away from the die face and which facilitates cutting of the ribbon of filler 30 at or near the die orifice 82. The guillotine retainer 110 may be secured or fastened to the guide 100 with conventional fastening devices such as bolts or screws 112 which pass through holes 114 in the guillotine retainer and are secured in threaded holes 116 in the guillotine guide 100.

A pneumatic device or air cylinder 120 may be connected to the guillotine knife or blade 95 for moving the knife or blade or cutter over the die aperture 82 to close and open the die aperture 82, and to perform the severing or cutting of the ribbon of filler 30 into base-cake-size pieces. The connection may be made with a clamp or other fastening devices such as bolts and screws. The guillotine knife or blade 95 and the air cylinder 120 may be mounted on a cylinder angle bracket 125 which may be secured to a cylinder bracket 130. The cylinder bracket 130 may be fastened to collars 135 which may secured to or tightened around the tubular shaft or stencil mandrel 60. Fastening of the cylinder bracket 130 to the collars 135 may be achieved with the use of conventional fasteners such as bolts or screws 140. The connection of the guillotine knife or blade 95 to the air cylinder and their mounting to the tubular shaft or stencil mandrel 60 provide for sliding engagement of the guillotine knife or blade 95 with the stationary die 80, stationary guillotine guide 100, and stationary guillotine retainer 110.

The detector device 20 may include a signal or timing mechanism 150 which activates the guillotine knife or blade 95 to open the die aperture 82 to allow filler 30 to be deposited on the bottom base cake 12. The signal or timing mechanism 150 may also activate the guillotine knife or blade 95 to close the die aperture 82 and to keep it closed for a predetermined time interval. Closing of the die aperture 82 severs or cuts the ribbon 30 to a predetermined dimension. The closing of the die aperture 82 also prevents further flow of the filler 30 through the die aperture 82 until the next bottom base cake 12 is detected by the detector device 20 and the die aperture 82 is opened to start the next cycle and allow filler 30 to be deposited on the next bottom base cake 12.

The detector device 20 and the signal or timing mechanism 150 employed may be conventional known electronic, mechanical, or electromechanical devices, such as an encoder, mechanical synchronization equipment, photoelectric eyes, motion detectors, imaging systems, and computers, which may be operatively connected to each other with a known communication connector or device 160 such as wired or wireless communication links, stepping motors, gears, and the like. In embodiments of the invention, timing or cycling of the guillotine movement for opening of the aperture, for severing of the extruded ribbon of filler, and for maintaining the aperture closed may be calculated based upon the detection of the position of the lower base cake, and known or predetermined parameters such as known spacing between the pins or bottom base cakes, the length of the base cakes, and the speed of movement of the conveyor.

The sandwiching equipment employed may be a conventional cookie or cracker sandwiching machine which is modified or retrofitted in accordance with the present invention with a filling depositor and base cake detector device, and signal and timing device for the application of a ribbon of icing to individual bottom base cakes without the need for rotating a filling depositor mandrel and without the need for stopping the continuous conveyance of a bottom base cake for application of the filler or filler crème. Conventional sandwiching machines equipped with a conveyor system for modification in accordance with the present invention include cookie sandwiching machines made by APV Baker, Peterborough, UK (e.g., an APV High Speed Creamer or Pile Pack Creamer sandwiching machine), and Peters Machinery Company, Chicago, Ill. Sandwiching machines which may be modified in accordance with the present invention are disclosed in U.S. Pat. No. 2,993,453 to Fay, U.S. Pat. No. 4,329,920 to Rose et al, U.S. Pat. No. 5,974,958 to Lilley et al, U.S. Pat. No. 4,708,054 to Newberry et al, U.S. Pat. No. 4,502,376 to Cosse, U.S. Pat. No. 4,162,882 to Rose, U.S. Pat. No. 4,397,628 to Pinto et al, U.S. Pat. No. 4,850,833 to Pinto et al, and U.S. Patent Publication No. 2006/0045939 to Mihalos et al the disclosures of which are herein incorporated by reference in their entireties.

The filler depositor of the present invention may be mounted on a main frame with upstream and downstream magazines that are longitudinally aligned and feed a conveyer system equipped with base cake conveying pins and cake supporting wires. The lower base cakes may be removed one-by-one from an upstream magazine by a plurality of pins that are moveable along a plurality of supporting wires. Generally, the pins are arranged in pairs in a plane which is generally perpendicular to two generally parallel support wires. Each pair of pins pushes each lower base cake which is supported on the tops of the wires to the cream depositor for deposition of the filler cream upon the lower base cake. After deposition of the filler cream, the lower base cakes with the deposits of filler cream are transported by the pins along the plurality of parallel wires to a downstream magazine from which the upper base cake is deposited to form a sandwich cookie.

The pins or fingers are generally cylindrically shaped and align the trailing edges of the top and bottom base cakes in the same vertical plane. For base cakes which are the same size, the leading edges of the base cakes would also be aligned in one vertical plane and the bottom and top base cakes would be aligned concentrically with each other. The plurality of parallel base cake supporting wires may extend between opposing pairs of pins. The pins may each be attached to links of endless chains of the conveyor system via a connector or side plate. The connector or side plate may be screwed into, riveted to, or otherwise attached or fastened via a fastener to the top or side wall of the chain in conventional manner. Each pin may be fastened to the connector or side plate by a screw or bolt or other conventional fastener which extends through or from the side plate into the pin. The endless chains may be driven by a motor, for example, an electric motor or the like around sprockets such as end sprockets.

The conveyer system may also include side rail guides for aligning the upper base cakes with the lower base cakes in a direction transverse to the direction of transport of the lower base cakes. The opposing side rail guides may be located outside of the support wires and the pins. The side rails may extend above and along the length of the supporting wires upon which the lower base cakes are transported during and after fabrication of the sandwich cookie. The side rails may extend above and along the length of the supporting wires upon which the lower base cakes are transported through the first magazine, through the depositing section, and up to the second magazine, at which point the guides may be offset to accommodate the upper base cake for the fabrication of the sandwich cookie.

After fabrication of the sandwich baked goods by the sandwiching machine, the sandwich baked goods may be transferred to a conveyer for optional application of a coating material. In embodiments of the invention, the sandwich baked goods may be enrobed in chocolate or a compound coating or treated with another flavoring and/or coloring agent using conventional coating or enrobing equipment. The sandwich cookies may then be conveyed for counting and packaging in a conventional manner.

The base cakes may be made in conventional manner using conventional cookie and cracker formulations, and flat bread formulations, and conventional dough forming equipment and machinery and baking ovens. For example, in embodiments of the invention, cookie base cakes may be produced using a rotary molder to form dough pieces and the dough pieces may be baked in a zone oven to obtain top and bottom base cakes. In other embodiments of the invention, a cracker base cakes may be produced by forming a dough sheet, laminating the sheeted dough, cutting the sheeted dough into pieces, and baking the pieces in a zone oven to obtain top and bottom base cakes. The base cakes may be made from whole grain flours and may have irregularly shaped sides. The filler or filler crème employed may be any conventional filler made in conventional manner. In embodiments, the filler cream 15 may be, for example, a chocolate or vanilla flavored filling (e.g., OREO® icing), a fruit filling, jam, jelly, peanut butter, a cheese flavored filling, and the like.

In embodiments of the invention the filler may contain inclusions, particulates or particulate flavoring ingredients, or morsels. Exemplary thereof which may be employed in the present invention include white, dark, or milk chocolate chips or chunks, butterscotch chips or chunks, vanilla chips or chunks, butter chips or chunks, peanut butter chips or chunks, coconut chips or chunks, caramel chips or chunks, fruit flavored chips or chunks, or other flavored chips or chunks, raisins, dried or dehydrated cranberries, raspberries, blueberries, strawberries, or other dried berries, fruit pieces, such as dried or dehydrated fruit pieces including apricot, apple, plum, peach, orange, banana, pineapple, mango, currant, sultana, and cherry pieces, nuts, or pieces of nuts such as macadamia nuts, peanuts, walnuts, almonds, hazelnuts, pecans, brazil nuts, pistachios, seeds such as pumpkin seeds, roasted or non-roasted coffee beans, dried or dehydrated vegetable pieces, such as carrot pieces, broccoli pieces, sun dried tomatoes, candy or candy bar pieces, ready-to-eat cereal clusters, and mixtures thereof. Exemplary shapes or forms of the inclusions which may be employed include drop shaped, chunk shaped, slices, diced, chopped or whole, such as whole raisins, whole macadamia nuts, whole peanuts, and mixtures thereof.

In embodiments of the invention, the volume of filler deposited on each bottom base cake may be at least about 1.5 cubic inches, for example at least about 1.75 cubic inches, and the deposited filler may have a length to width ratio of at least about 2:1, preferably at least about 2.5:1. For example, in preferred embodiments, the bottom and top base cakes may each be about 4.5 inches long and about 1.75 inches wide, and the volume of the filler deposited on the bottom base cake may be about 1.87 cubic inches, with the filler covering at least substantially the top surface of the bottom base cake. The base cakes and the ribbon of filler may be elongated in the direction of conveyance during deposition of the ribbon of filler.

In embodiments of the invention, the sandwich baked goods may be produced continuously and at high mass production rates, for example at least about 75 sandwiches per minute, preferably at least about 90 sandwiches per minute. In accordance with the methods of the present invention a bottom base cake having a leading edge and a trailing edge may be laminated with a filler by detecting the position of the base cake as it is being conveyed, extruding a filler through a die aperture to form a ribbon having a leading edge in response to the detection of the position of the bottom base cake, depositing the ribbon onto the bottom base cake so that the leading edge of the ribbon is at or near the leading edge of the bottom base cake, severing the ribbon to form a laminate of the filler on the bottom base cake, and depositing a top base cake on the laminate to form a sandwich baked good.

In accordance with the present invention, when the ribbon is severed, further flow of the filler through the die aperture is prevented until the next bottom base cake is detected, and until the proper moment when the die aperture is opened to allow filler to be deposited on the next bottom base cake. The ribbon may be severed and the flow of filler may be prevented by a guillotine knife or blade. The filler may be pumped into and through a stationary, non-rotating tubular shaft equipped with a non-rotating die and die aperture. As the filler emerges from the die aperture the filler may be deposited upon the lower base cakes while the lower base cakes are conveyed past the die aperture without stopping of the base cakes.

In embodiments of the invention, an edge of the bottom base cake may be detected and in response to the detection a signal or timing mechanism may activate the guillotine knife or blade to open the die aperture to allow filler to be deposited on the bottom base cake. The signal or timing mechanism may also activate the guillotine knife or blade to close the die aperture to sever or cut the ribbon to a predetermined dimension. In embodiments of the invention, the leading edge or trailing edge of the bottom base cake may be detected and in response to the detection a signal or timing mechanism may activate a guillotine knife or blade to open the die aperture to allow filler to be deposited on a bottom base cake. Also, a leading or a trailing edge of the bottom base cake may be detected, and in response to the detection a signal or timing mechanism may activate a guillotine knife or blade to sever or cut the ribbon to a predetermined dimension, and block further extrusion of the filler until the next deposition cycle for the next base cake.

The timing mechanism may activate the guillotine knife or blade after a predetermined amount of time which is calculated so that the leading edge of the ribbon is deposited near the leading edge of the bottom base cake. Also, in response to the detection, the signal or timing mechanism may activate the guillotine knife or blade after a predetermined amount of time which is calculated so that the ribbon is severed to obtain a ribbon trailing edge, and the ribbon trailing edge is permitted to fall onto the bottom base cake so the ribbon trailing edge is at or near the trailing edge of the bottom base cake.

In embodiments of the invention, the lower base cakes may be conveyed by a plurality of pins which push the lower base cakes past the die aperture, and an edge of the bottom base cake may be detected by detecting the presence of at least one pin conveying the bottom base cake. In response to the detection the signal or timing mechanism may activate the guillotine knife or blade to open the die aperture to allow filler to be deposited on a bottom base cake and may activate the guillotine knife or blade to close the die aperture to sever or cut the ribbon to a predetermined dimension.

In other embodiments of the invention, non-sandwich or un-sandwiched baked products or laminated bar products, such as cookie bar products may be produced with a ribbon of filler laminated or deposited on a bottom base cake by eliminating the deposition of a top base cake. In accordance with aspects of the present invention, baked products with a filler laminated only to a single base cake may be produced using a bottom base cake having a flat surface or having a top surface with a cavity, recess, or indentation in which the filler may be deposited. A ribbed pattern, like a corduroy pattern or saw tooth pattern may be provided on the top surface of the layer or ribbon of laminated filler using a die aperture with a saw tooth or ribbed or multi-notched configuration on its top or upper side. In embodiments of the invention, the laminate or non-sandwich baked product may be enrobed with an enrobing composition such as chocolate, and/or sprinkled with inclusions such as chocolate chips or sprinkles.

What is claimed is:

1. A method for the continuous production of sandwich or non-sandwich baked goods comprising:
   a) conveying a bottom base cake in a direction from upstream of a die aperture to downstream of the die aperture, the bottom base cake having a leading edge and a trailing edge which are relative to the direction of conveying of the bottom base cake,
   b) detecting a position of the base cake,
   c) extruding a filler through the die aperture to form a ribbon having a leading edge which is relative to the direction of conveying of the bottom base cake, said extruding being in response to the detection of the position of the bottom base cake,
   d) depositing the ribbon onto the bottom base cake so that the leading edge of the ribbon is at or near the leading edge of the bottom base cake, and
   e) severing the ribbon to form a laminate of the filler on the bottom base cake, wherein when the ribbon is severed further flow of the filler through the die aperture is prevented until the next bottom base cake is detected and the die aperture is opened to allow filler to be deposited on said next bottom base cake, and wherein the ribbon is severed and the flow of filler is prevented by a guillotine knife or blade.

2. A method for the continuous production of sandwich or non-sandwich baked goods as claimed in claim 1 wherein the ribbon is severed to obtain a ribbon trailing edge and the ribbon trailing edge is permitted to fall onto the bottom base cake so the ribbon trailing edge is at or near the trailing edge of the bottom base cake.

3. A method for the continuous production of sandwich or non-sandwich baked goods as claimed in claim 1 wherein an edge of the bottom base cake is detected and in response to said detection a signal or timing mechanism activates the guillotine knife or blade which severs or cuts the ribbon to a predetermined dimension.

4. A method for the continuous production of sandwich or non-sandwich baked goods as claimed in claim 3 wherein the trailing edge of the bottom base cake is detected and in response to said detection the signal or timing mechanism activates the guillotine knife or blade which severs or cuts the ribbon to a predetermined dimension.

5. A method for the continuous production of sandwich or non-sandwich baked goods as claimed in claim 3 wherein the leading edge of the bottom base cake is detected and in response to said detection the signal or timing mechanism activates the guillotine knife or blade which severs or cuts the ribbon to a predetermined dimension.

6. A method for the continuous production of sandwich or non-sandwich baked goods as claimed in claim 1 wherein the leading edge of the bottom base cake is detected and in response to the detection a signal or timing mechanism activates the guillotine knife or blade to open the die aperture to allow filler to be deposited on a bottom base cake.

7. A method for the continuous production of sandwich or non-sandwich baked goods as claimed in claim 6 wherein in response to the detection of the leading edge of the bottom base cake the signal or timing mechanism activates the guillotine knife or blade after a predetermined amount of time which is calculated so that the leading edge of the ribbon is deposited near the leading edge of the bottom base cake.

8. A method for the continuous production of sandwich or non-sandwich baked goods as claimed in claim 3 wherein the leading edge of the bottom base cake is detected and in response to the detection the signal or timing mechanism activates the guillotine knife or blade to open the die aperture to allow filler to be deposited on a bottom base cake.

9. A method for the continuous production of sandwich or non-sandwich baked goods as claimed in claim 1 wherein an edge of the bottom base cake is detected and in response to said detection a signal or timing mechanism activates the guillotine knife or blade to open the die aperture to allow filler to be deposited on a bottom base cake and activates the guillotine knife or blade to close the die aperture to sever or cut the ribbon to a predetermined dimension.

10. A method for the continuous production of sandwich or non-sandwich baked goods comprising:
conveying a bottom base cake in a direction from upstream of a die aperture to downstream of the die aperture, the bottom base cake having a leading edge and a trailing edge which are relative to the direction of conveying of the bottom base cake;
detecting a position of the base cake;
extruding a filler through the die aperture to form a ribbon having a leading edge which is relative to the direction of conveying of the bottom base cake, said extruding being in response to the detection of the position of the bottom base cake;
depositing the ribbon onto the bottom base cake so that the leading edge of the ribbon is at or near the leading edge of the bottom base cake, and;
severing the ribbon to form a laminate of the filler on the bottom base cake, wherein when the ribbon is severed further flow of the filler through the die aperture is prevented until the next bottom base cake is detected and the die aperture is opened to allow filler to be deposited on said next bottom base cake, and wherein an edge of the bottom base cake is detected by detecting the presence of at least one pin conveying the bottom base cake.

11. A method for the continuous production of sandwich or non-sandwich baked goods as claimed in claim 1 wherein the lower base cake is conveyed by a plurality of pins which push the lower base cake past the die aperture, an edge of the bottom base cake is detected by detecting the presence of at least one pin conveying the bottom base cake, and in response to said detection a signal or timing mechanism activates the guillotine knife or blade to open the die aperture to allow filler to be deposited on a bottom base cake and activates the guillotine knife or blade to close the die aperture to sever or cut the ribbon to a predetermined dimension.

12. A method for the continuous production of sandwich or non-sandwich baked goods as claimed in claim 1 wherein the lower base cake is a cracker or cookie, the filler is pumped into and through a tubular shaft equipped with said die aperture, and as the filler emerges from the die aperture the filler is deposited upon the lower base cake while the lower base cake is conveyed past the die aperture by a plurality of pins which push the lower base cake.

13. A method for the continuous production of sandwich or non-sandwich baked goods as claimed in claim 1 wherein the volume of filler deposited on each bottom base cake is at least about 1.5 cubic inches, and the bottom base cake is elongated in the direction of conveyance.

14. A method for the continuous production of sandwich or non-sandwich baked goods as claimed in claim 1 wherein the filler is deposited with an uneven surface pattern using a die having a saw tooth pattern aperture.

15. A method for the continuous production of sandwich or non-sandwich baked goods as claimed in claim 1 wherein the filler contains particulates.

16. A method for the continuous production of sandwich or non-sandwich baked goods as claimed in claim 1 wherein the filler is deposited with a substantially even surface pattern using a die aperture in the form of a slit, and the deposited filler has a length to width ratio of at least about 2:1.

17. A method for the continuous production of sandwich or non-sandwich baked goods as claimed in claim 1 further comprising depositing a top base cake on the laminate to form a sandwich baked good.

* * * * *